US011825331B2

(12) United States Patent
Kotecha et al.

(10) Patent No.: US 11,825,331 B2
(45) Date of Patent: Nov. 21, 2023

(54) SYSTEMS AND METHODS FOR QUALITY-OF-SERVICE FRAMEWORK FOR ENTERPRISE APPLICATIONS IN MOBILE WIRELESS NETWORKS

(71) Applicant: Verizon Patent and Licensing Inc., Basking Ridge, NJ (US)

(72) Inventors: Lalit R. Kotecha, San Ramon, CA (US); Violeta Cakulev, Millburn, NJ (US); Hossein M. Ahmadi, Parsippany, NJ (US); Ali Imdad Malik, East Brunswick, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 149 days.

(21) Appl. No.: 17/205,707

(22) Filed: Mar. 18, 2021

(65) Prior Publication Data
US 2022/0303822 A1     Sep. 22, 2022

(51) Int. Cl.
*H04W 28/02*     (2009.01)
*H04M 15/00*     (2006.01)

(52) U.S. Cl.
CPC ........ *H04W 28/0268* (2013.01); *H04M 15/66* (2013.01); *H04W 28/0257* (2013.01); *H04W 28/0263* (2013.01)

(58) Field of Classification Search
CPC ............. H04M 15/66; H04W 28/0257; H04W 28/0263; H04W 28/0268
See application file for complete search history.

(56) References Cited

U.S. PATENT DOCUMENTS

| 7,697,422 B1 * | 4/2010 | Arad ................... H04L 47/20 370/252 |
| 8,040,901 B1 * | 10/2011 | Kompella ............ H04L 12/437 370/395.71 |
| 9,497,107 B1 * | 11/2016 | Akiya ................... H04L 43/10 |
| 2005/0220022 A1 * | 10/2005 | DelRegno ............ H04L 47/10 370/235 |
| 2015/0110009 A1 * | 4/2015 | Berzin ................. H04L 45/302 370/329 |
| 2015/0120890 A1 * | 4/2015 | Ghai .................... H04W 48/17 709/221 |

(Continued)

FOREIGN PATENT DOCUMENTS

| EP | 3627962 A1 * | 3/2020 | ............ H04L 47/14 |
| EP | 3739841 A1 * | 11/2020 | ........... H04L 61/203 |

(Continued)

*Primary Examiner* — Mehmood B. Khan

(57) ABSTRACT

A device may include a processor configured to determine, in a core network associated with a radio access network, that a user equipment (UE) device, associated with an enterprise, has attached to the core network via a base station in the radio access network. The processor may be further configured to obtain a mapping between a plurality of applications associated with the enterprise and a plurality of Quality of Service (QoS) classes; identify an application, of the plurality of applications, for a communication session associated with the UE device; select a QoS class, from the plurality of QoS classes based on the identified application and the obtained mapping; and process messages associated with the communication session based on the selected QoS class.

20 Claims, 10 Drawing Sheets

(56) References Cited

U.S. PATENT DOCUMENTS

| | | | | |
|---|---|---|---|---|
| 2016/0338102 A1* | 11/2016 | Nuggehalli | ............ | H04W 74/08 |
| 2018/0062945 A1* | 3/2018 | Ni | ....................... | H04L 41/5045 |
| 2019/0268973 A1* | 8/2019 | Bull | ..................... | H04W 92/02 |
| 2021/0084523 A1* | 3/2021 | Kucera | ................. | H04W 28/06 |
| 2021/0194728 A1* | 6/2021 | Gundavelli | ............ | H04M 15/66 |
| 2021/0194740 A1* | 6/2021 | Aldana | ............. | H04W 72/1215 |
| 2021/0266915 A1* | 8/2021 | Sirotkin | ................... | H04L 47/41 |
| 2021/0337422 A1* | 10/2021 | Jeyabalan | ............ | H04W 28/086 |
| 2022/0060392 A1* | 2/2022 | Takase | ................. | H04L 61/5007 |
| 2022/0200948 A1* | 6/2022 | Gundavelli | ............ | H04W 24/04 |
| 2022/0279023 A1* | 9/2022 | Solari | ..................... | H04L 9/3263 |
| 2022/0314971 A1* | 10/2022 | Wang | .................. | B60W 30/095 |

FOREIGN PATENT DOCUMENTS

| | | | | |
|---|---|---|---|---|
| WO | WO-2020078418 A1 * | 4/2020 | ............. | H04L 61/20 |
| WO | WO-2021038443 A1 * | 3/2021 | ........ | H04W 36/0009 |

* cited by examiner

1000

| UE DEVICE ID | VLAN ID | TUNNEL ID | DSCP | QCI | DESCRIPTION |
|---|---|---|---|---|---|
| IMSI-a – IMSI-n | a | x | A | 7 | HIGH PRIORITY TRAFFIC |
|  | b | y | B | 8 | BEST EFFORT TRAFFIC |
|  | c | z | C | 1 | VOICE TRAFFIC |

| APPLICATION | SOURCE PORT | DESTINATION PORT | PROTOCOL | QoS |
|---|---|---|---|---|
| VOICE | A | B | RTP | QCI 1 |
| VIDEO TELEPHONY | a | b | RTP | QCI 6 |
| EMAIL, MESSAGING | xx yy | AA BB | SMTP | QCI 7 |
| WEB BROWSING | i | J | HTTP | QCI 8 |

FIG. 10B

SYSTEMS AND METHODS FOR QUALITY-OF-SERVICE FRAMEWORK FOR ENTERPRISE APPLICATIONS IN MOBILE WIRELESS NETWORKS

BACKGROUND INFORMATION

To satisfy the needs and demands of users of mobile communication devices, providers of wireless communication services continue to improve and expand available services and networks used to deliver such services. One aspect of such improvements includes the development of wireless access networks and options to utilize such wireless access networks. A wireless access network may manage a large number of enterprises. Each enterprise may in turn manage a large number of user devices. The user devices may request different types of services. Managing all the various types of services, user devices, and enterprises poses various challenges.

BRIEF DESCRIPTION OF THE DRAWINGS

FIGS. 10A and 10B are diagrams illustrating exemplary enterprise policies according to an implementation described herein.

DETAILED DESCRIPTION OF PREFERRED EMBODIMENTS

Figure 1:
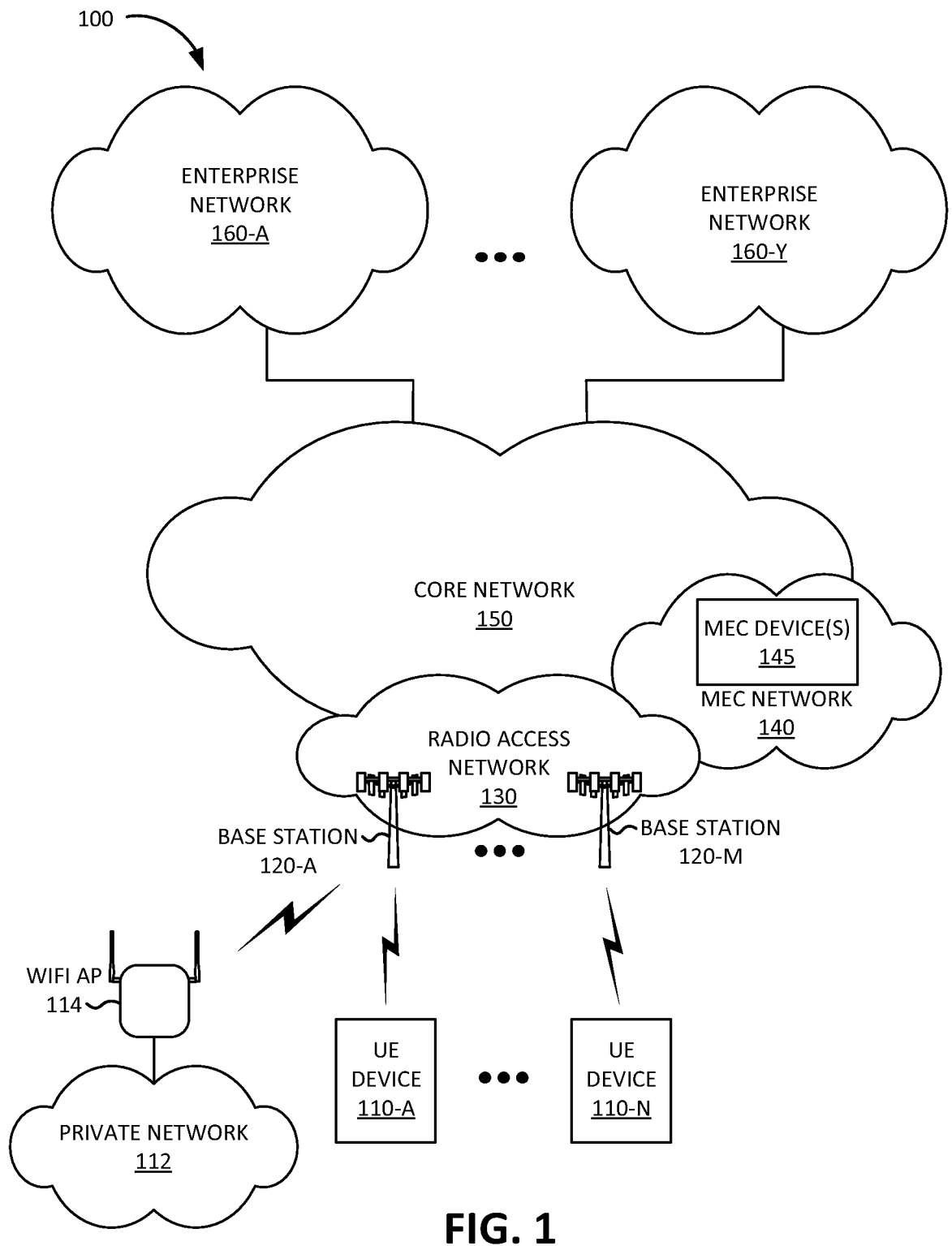
FIG. 1 illustrates an environment according to an implementation described herein.

The following detailed description refers to the accompanying drawings. The same reference numbers in different drawings identify the same or similar elements.

Users of mobile wireless communication services may use various wireless technologies to connect to a network and/or communicate with other users. For example, a user equipment (UE) device may be configured to communicate with a Radio Access Network (RAN) via a base station using cellular wireless signals based on the Fourth Generation (4G) Long Term Evolution (LTE) air interface, the Fifth Generation (5G) New Radio (NR) air interface, and/or another type of air interface.

4G and/or 5G wireless networks provide differentiated services using different Quality of Service (QoS) classes for different applications, such as real-time voice or video communications, streaming audio or video, best effort Internet traffic, etc. When a wireless communication device, referred to as a user equipment (UE) device, connects to an application on the network, the data traffic flow for the application session is associated with a particular QoS class. An enterprise, such as a business, government agency, or organization, may manage a private network. The enterprise may enable UE devices associated with employees and/or customers of the enterprise, and/or Internet of Things (IoT) devices that use a machine to machine (M2M) communication, to access devices in the private network and/or use applications hosted by the devices in the private network. The UE devices may access the private network of the enterprise via a wireless connection using a base station and/or a wireless access point (AP), such as a WiFi AP. A provider of telecommunication services may manage the wireless connection and/or the connection from the base station and/or WiFi AP to the private network of the enterprise.

The provider of communication services may assign a particular QoS class to a particular type of data flow. For example, data traffic associated with real-time audio may be assigned a first QoS class and data traffic associated with email messages may be assigned a second QoS class. However, enterprises may desire to assign their own QoS classes to a set of applications. For example, a first enterprise may desire to assign a QoS Class Indicator (QCI) value of 1 for voice communication, a QCI value 7 for email communication, and a QCI value of 8 for all other types of traffic, while a second enterprise may desire to assign a QCI value of 7 for voice communication and a QCI value of 8 for all other types of traffic. Thus, the provider may need to be able to process data traffic associated with an enterprise based on the QoS preferences associated with the enterprise.

Implementations described herein relate to a QoS framework for enterprise applications in mobile wireless networks. A policy device may obtain, from a private network associated with an enterprise, a mapping from applications associated with the enterprise to QoS classes. An application associated with the enterprise may be identified based on an application label, a tunnel label, a virtual local area network (VLAN) label, a Differentiated Services Code Point (DSCP) value, and/or another type of identifier. Thus, the mapping may include a mapping between application labels, tunnel labels, VLAN labels, DSCP values, and/or other types of identifiers and QoS values. The policy device may include the mapping in a policy and provide the policy to a gateway device that manages a communication session for a UE device associated with the enterprise.

The gateway device may be configured to determine, in a core network associated with a RAN, that UE device, associated with an enterprise, has attached to the core network via a base station in the RAN. The gateway device may, in response, obtain the mapping between the applications associated with the enterprise and the QoS classes. The gateway device may subsequently identify an application for a communication session associated with the UE device, select a QoS class based on the identified application and the obtained mapping, and process messages associated with the communication session based on the selected QoS class.

In some implementations, the gateway device may include a Packet Data Network Gateway (PGW) and the policy device may include a Policy and Charging Rules Function (PCRF). In other implementations, the gateway device may include a User Plane Function (UPF) and the policy device may include a Policy Control Function (PCF).

In some implementations, the mapping may further include a guaranteed bit rate (GBR) value for one or more of the applications associated with the enterprise, an aggregate maximum bit rate (AMBR) value for one or more of the applications associated with the enterprise, and/or other types of information that may be used by the gateway device in processing messages associated with the communication session.

Furthermore, in some implementations, a provider of communication services, which manages a RAN and/or core network providing cellular wireless communication services for the enterprise, may also manage one or more WiFi AP devices, which attach to the core network via the RAN using a cellular wireless modem, for the enterprise. The provider may configure the WiFi APs with the QoS policy associated with the enterprise so that the WiFi AP maintains the QoS classes for data traffic in the wireless local area network (WLAN) associated with the WiFi AP.

FIG. 1 is a diagram of an exemplary environment 100 in which the systems and/or methods, described herein, may be implemented. As shown in FIG. 1, environment 100 may include UE devices 110-A to 110-N (referred to herein collectively as "UE devices 110" and individually as "UE device 110"), a private network 112, a WiFi AP 114, base stations 120-A to 120-M (referred to herein collectively as "base stations 120" and individually as "base station 120") in RAN 130, MEC network 140 (which includes MEC devices 145), core network 150, and enterprise networks 160-A to 160-Y (referred to herein collectively as "enterprise networks 160" and individually as "enterprise network 160").

UE device 110 may include any device with cellular wireless communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device with wireless communication capabilities and a user interface. UE device 110 may include capabilities for voice communication, mobile broadband services (e.g., video streaming, real-time gaming, premium Internet access etc.), best effort data traffic, and/or other types of applications.

In some implementations, UE device 110 may communicate using M2M communication, such as Machine Type Communication (MTC), and/or another type of M2M communication for IoT applications. For example, UE device 110 may include a health monitoring device (e.g., a blood pressure monitoring device, a blood glucose monitoring device, etc.), an asset tracking device (e.g., a system monitoring the geographic location of a fleet of vehicles, etc.), a traffic management device (e.g., a traffic light, traffic camera, road sensor, road illumination light, etc.), a climate controlling device (e.g., a thermostat, a ventilation system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, a utility meter, a fault diagnostics device, etc.), a device controlling a financial transaction system (e.g., a point-of-sale terminal, an automated teller machine, a vending machine, a parking meter, etc.), and/or another type of electronic device.

Private network 112 may include a WLAN serviced by WiFi AP 114 and associated with an enterprise. For example, private network 112 may be associated with a remote office and UE device 110 may connect to enterprise network 160 via private network 112 and WiFi AP 114. WiFi AP 114 may include a device with a transceiver configured to communicate with client devices 140 using WiFi signals based on the Institute of Electrical and Electronics Engineers (IEEE) 802.11 standards for implementing a WLAN network. WiFi AP 114 may include a cellular wireless modem and may attach to base station 120 and may establish IP connectivity to enterprise network 160 via RAN 130 and core network 150. In some implementations, WiFi AP 114 may be managed by the provider of communication services that manages RAN 130 and/or core network 150. The provider may configure WiFi AP 114 to implement an enterprise QoS policy associated with the enterprise that owns or uses private network 112.

RAN 130 may include base stations 120. Base station 120 may include a 5G NR base station (e.g., a gNodeB) and/or a 4G LTE base station (e.g., an eNodeB). Each base station 120 may include devices and/or components configured to enable cellular wireless communication with UE devices 110. For example, base station 120 may include a radio frequency (RF) transceiver configured to communicate with UE devices 110 using a 5G NR air interface using a 5G NR protocol stack, a 4G LTE air interface using a 4G LTE protocol stack, and/or using another type of cellular air interface. Base station 120 may enable communication with core network 150 to enable core network 150 to authenticate UE device 110 with a subscriber management device (e.g., Home Subscriber Server (HSS) in 4G, Unified Data Management (UDM) in 5G, etc.). Furthermore, base station 120 may establish an encrypted wireless communication channel with UE device 110 using session keys generated as part of the authentication process. Base stations 120 may facilitate handovers in RAN 130. For example, UE device 110 may move from a service area of a first base station 120 to the service area of a second base station 120 and a connection may be handed over from the first base station 120 to the second base station 120 in response.

MEC network 140 may include one or more MEC devices 145. MEC devices 145 may provide MEC services to UE devices 110. A MEC service may include, for example, a low-latency microservice associated with a particular application, such as, for example, a user authentication microservice, a navigation microservice, an online shopping microservice, a content delivery microservice, a gaming microservice, a virtual and/or augmented reality microservice, a health monitoring microservice, and/or another type of microservice associated with a low latency requirement. As another example, a MEC microservice may include a microservice associated with a virtualized network function (VNF) of core network 150. As yet another example, a MEC microservice may include a cloud computing service, such as cache storage, use of artificial intelligence (AI) accelerators for machine learning computations, image processing, data compression, locally centralized gaming, use of Graphics Processing Units (GPUs) and/or other types of hardware accelerators for processing of graphics information and/or other types of parallel processing, and/or other types of cloud computing services.

MEC network 140 may include a public MEC network and/or a private MEC network associated with a particular enterprise. The enterprise may select a particular application, or a particular microservice associated with an application, for a QoS value associated with MEC network 140. Thus, messages associated with the particular application or the particular microservice may be routed or switched to MEC network 40.

Core network 150 may be managed by a provider of cellular wireless communication services and may manage communication sessions of subscribers connecting to core network 150 via RAN 130. For example, core network 150 may establish an Internet Protocol (IP) connection between UE devices 110 and enterprise network 160. In some implementations, core network 150 may include a 4G core network (e.g., an evolved packet core (EPC) network). Exemplary components of a 4G core network are described below with reference to FIG. 2. In other implementations, core network 150 may include a 5G core network. Exemplary components of a 5G core network are described below with reference to FIG. 3.

The components of core network 150 may be implemented as dedicated hardware components or as virtualized functions implemented on top of a common shared physical infrastructure using Software Defined Networking (SDN). For example, an SDN controller may implement one or more of the components of core network 150 using an adapter implementing a VNF virtual machine, a Cloud Native Function (CNF) container, an event driven serverless architecture interface, and/or another type of SDN architecture. The common shared physical infrastructure may be implemented using one or more devices 400 described below with reference to FIG. 4 in a cloud computing center associated with core network 150. Additionally, or alternatively, some, or all, of the common shared physical infrastructure may be implemented using one or more devices 400 implemented in MEC device 145 in MEC network 140.

Enterprise networks 160-A to 160-Y may each include a private network associated with an enterprise. For example, a first enterprise may be associated with enterprise network 160-A, a second enterprise may be associated with enterprise network 160-B, etc. However, an enterprise may be associated with multiple enterprise networks 160. A particular enterprise network 160 may be associated with an Access Point Name (APN) and a UE device may request a connection to enterprise network 160 using the APN. Enterprise network 160 may include, and/or be connected to and enable communication with, a local area network (LAN), a wide area network (WAN), a metropolitan area network (MAN), an autonomous system (AS) on the Internet, an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
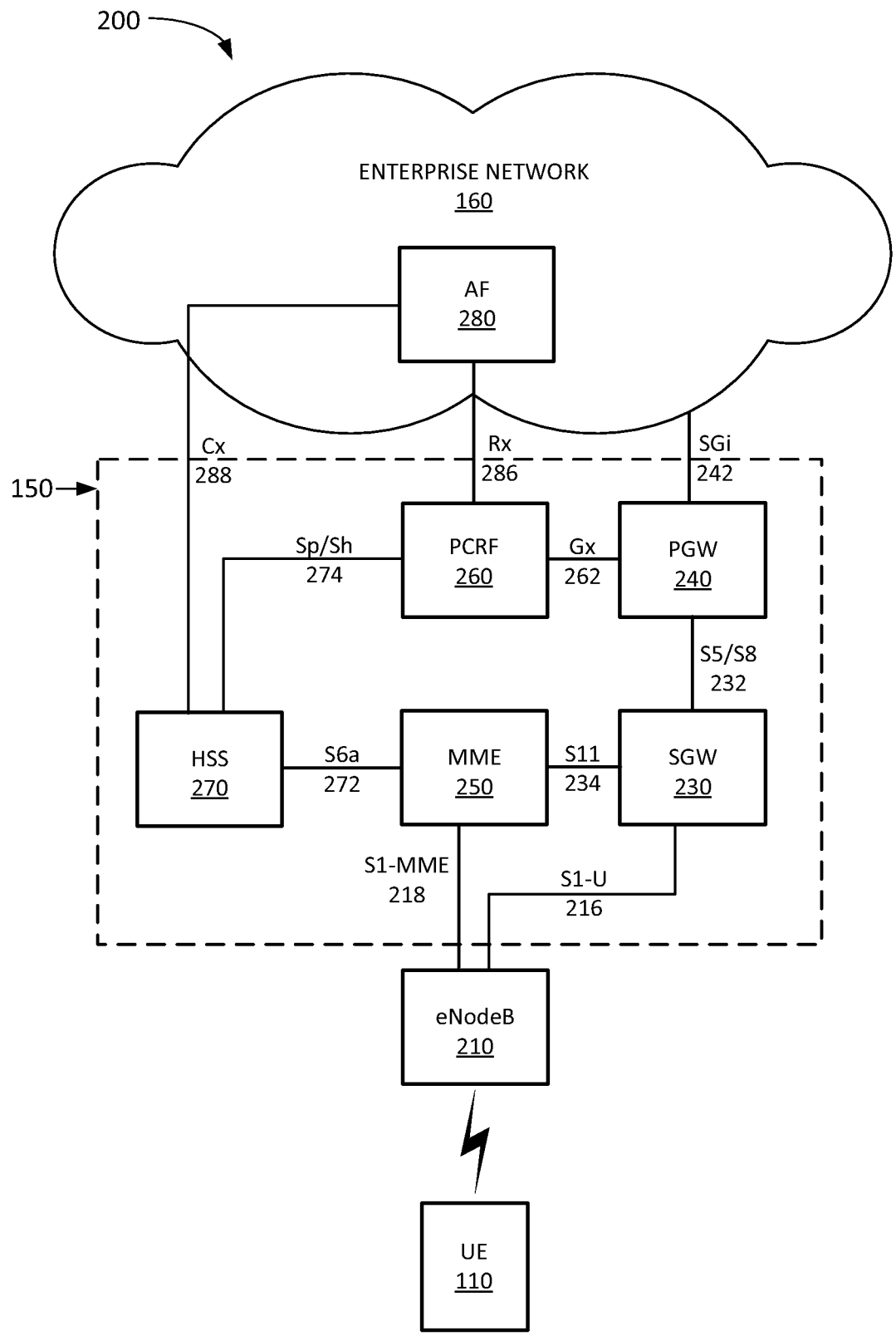
FIG. 2 is a diagram illustrating exemplary components of a Fourth Generation core network according to an implementation described herein.

FIG. 2 illustrates a system 200 that includes exemplary components of core network 150 that includes a 4G LTE core network according to an implementation described herein. As shown in FIG. 2, system 200 may include UE device 110, eNodeB 210, core network 150, and enterprise network 160. eNodeB 210 may correspond to, or be included in, base station 120. eNodeB 210 may communicate with UE device 110 using a 4G LTE air interface referred to as an Evolved Universal Mobile Telecommunications System (UMTS) Terrestrial Radio Access Network (E-UTRA) interface 212.

As shown in FIG. 2, core network 150 may include a Serving Gateway (SGW) 230, a Packet Data Network (PDN) Gateway (PGW) 240, a Mobility Management Entity (MME) 250, a Policy and Charging Rules Function (PCRF) 260, and HSS 270. While FIG. 2 depicts a single eNodeB 210, a single SGW 230, a single PGW 240, a single MME 250, a single PCRF 260, and a single HSS 270, for illustration purposes, in practice, system 200 may include multiple eNodeBs 210, multiple SGWs 230, multiple PGWs 240, multiple MMEs 250, multiple PCRFs 260, and/or multiple HSSs 270.

eNodeB 210 may interface with core network 150 via an interface referred to as an S1 interface, which may include both a control plane S1-MME interface 218 and a data plane S1-U interface 216. S1-MME interface 218 may interface with MME 250. S1-MME interface 218 may be implemented, for example, with a protocol stack that includes a Non-Access Stratum (NAS) protocol and/or Stream Control Transmission Protocol (SCTP). An S1-U interface 216 may interface with SGW 230 and may be implemented, for example, using General Packet Radio Service (GPRS) Tunneling Protocol version 2 (GTPv2).

SGW 230 may provide an access point to and from UE device 110, may handle forwarding of data packets for UE device 110, and may act as a local anchor point during handover procedures between different eNodeBs 210. SGW 230 may interface with PGW 240 through an S5/S8 interface 232. S5/S8 interface 232 may be implemented, for example, using GTPv2. PGW 240 may function as a gateway to IP network 201 through an SGi interface 242. A particular UE device 110, while connected to a single SGW 230, may be connected to multiple PGWs 240, one for each data network (e.g., enterprise network 160) with which UE device 110 communicates. For example, a particular PGW 240 may be associated with a particular APN and UE device 110 may connect to the particular APN by connecting to the PGW 240 associated with the particular APN. Thus, UE device 110 may be connected to one or more APNs at a particular time.

MME 250 may implement control plane processing for core network 150. For example, MME 250 may manage the mobility of UE device 110, implement tracking and paging procedures for UE device 110, activate and deactivate bearers for UE device 110, authenticate a user of UE device 110, and/or interface to non-LTE radio access networks. A bearer may represent a logical channel with particular QoS requirements. MME 250 may also select a particular SGW 230 for a particular UE device 110. A particular MME 250 may interface with other MMEs 250 (not shown in FIG. 2) in core network 150 and may send and/or receive information associated with UE devices 110, which may allow one MME 250 to take over control plane processing for UE devices 110 serviced by another MME 250, if the other MME 250 becomes unavailable. Furthermore, MME 250 may manage non-IP communication with UE device 110 using NAS. MME 250 may page UE device 110 based on mobility category information associated with UE device 110 obtained from HSS 270.

MME 250 may communicate with SGW 230 through an S11 interface 234. S11 interface 234 may be implemented, for example, using GTPv2. S11 interface 234 may be used to create and manage a new session for a particular UE device 110. S11 interface 234 may be activated when MME 250 needs to communicate with SGW 230, such as when the particular UE device 110 attaches to core network 150, when bearers need to be added or modified for an existing session for the particular UE device 110, when a connection to a new PGW 240 needs to be created, or during a handover procedure (e.g., when the particular UE device 110 needs to switch to a different SGW 230).

PCRF 260 may implement policy and charging rules functions, such as establishing QoS requirements, setting allowed bandwidth and/or data throughput limits for particular bearers and/or UE devices 110, determining charges for a particular service for a UE device 110, and/or other types of policy or charging rules. PCRF 260 may communicate with PGW 240 through a Gx interface 262. Gx interface 262 may be implemented, for example, using Diameter protocol. Furthermore, PCRF 260 may obtain an enterprise policy that includes a mapping between applications associated with the enterprise and QoS classes and may provide the enterprise policy to PGW 240.

HSS 270 may store subscription information associated with UE devices 110 and/or information associated with users of UE devices 110. For example, HSS 270 may store subscription profiles that include authentication, access, and/or authorization information. Each subscription profile may include information identifying UE device 110, authentication and/or authorization information for UE device 110, services enabled and/or authorized for UE device 110, device group membership information for UE device 110, and/or other types of information associated with UE device 110. HSS 270 may communicate with MME 250 through an S6a interface 272. S6a interface 272 may be implemented, for example, using a Diameter protocol. HSS 270 may communicate with PCRF device 260 using an Sp/Sh interface 274. AF 280 may provide an enterprise policy to PCRF 260. AF 280 may communicate with PCRF 260 through an Rx interface 286 and may communicate with HSS 250 through a Cx interface 288. Rx interface 286 and Cx interface 288 may be implemented, for example, using Diameter protocol.

Although FIG. 2 shows exemplary components of core network 150, in other implementations, core network 150 may include fewer components, different components, differently arranged components, or additional components than depicted in FIG. 2. Additionally, or alternatively, one or more components of core network 150 may perform functions described as being performed by one or more other components of core network 150.

Figure 3:
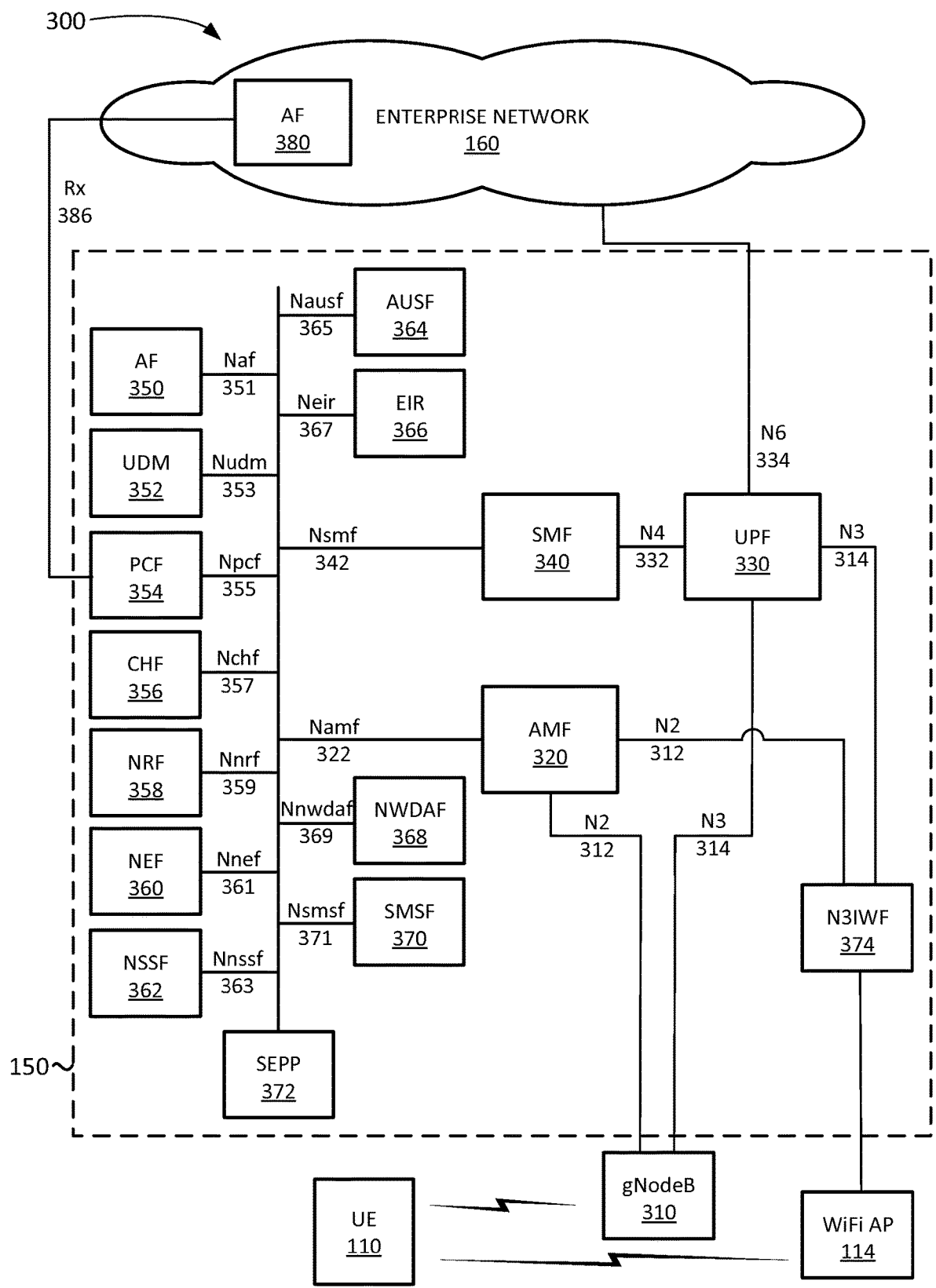
FIG. 3 is a diagram illustrating exemplary components of a Fifth Generation core network according to an implementation described herein.

FIG. 3 illustrates a system 300 that includes exemplary components of core network 150 in the context of environment 100 according to an implementation described herein. As shown in FIG. 3, system 300 may include UE device 110, gNodeB 310, core network 150, and enterprise network 160.

gNodeB 310 (corresponding to base station 120) may include one or more devices (e.g., base stations) and other components and functionality that enable UE device 110 to wirelessly connect to core network 150 using 5G NR Radio Access Technology (RAT). For example, gNodeB 310 may service one or more cells, with each cell being served by a wireless transceiver with an antenna array configured for mm-wave wireless communication. gNodeB 310 may communicate with AMF 320 using an N2 interface 312 and communicate with UPF 330 using an N3 interface 314.

Core network 150 may include an Access and Mobility Function (AMF) 320, a User Plane Function (UPF) 330, a Session Management Function (SMF) 340, an Application Function (AF) 350, a Unified Data Management (UDM) 352, a Policy Control Function (PCF) 354, a Charging Function (CHF) 356, a Network Repository Function (NRF) 358, a Network Exposure Function (NEF) 360, a Network Slice Selection Function (NSSF) 362, an Authentication Server Function (AUSF) 364, a 5G Equipment Identity Register (EIR) 366, a Network Data Analytics Function (NWDAF) 368, a Short Message Service Function (SMSF) 370, a Security Edge Protection Proxy (SEPP) 372, and a Non-3GPP Inter-Working Function (N3IWF) 374.

While FIG. 3 depicts a single AMF 320, UPF 330, SMF 340, AF 350, UDM 352, PCF 354, CHF 356, NRF 358, NEF 360, NSSF 362, AUSF 364, EIR 366, NWDAF 368, SMSF 370, SEPP 372, and N3IWF 374 for illustration purposes, in practice, core network 150 may include multiple AMFs 320, UPFs 330, SMFs 340, AFs 350, UDMs 352, PCFs 354, CHFs 356, NRFs 358, NEFs 360, NSSFs 362, AUSFs 364, EIRs 366, NWDAFs 368, SMSFs 370, SEPPs 372, and/or N3IWFs 374.

AMF 320 may perform registration management, connection management, reachability management, mobility management, lawful intercepts, Short Message Service (SMS) transport between UE device 110 and SMSF 370, session management messages transport between UE device 110 and SMF 340, access authentication and authorization, location services management, functionality to support non-3GPP access networks, and/or other types of management processes. AMF 320 may be accessible by other function nodes via an Namf interface 322.

UPF 330 may maintain an anchor point for intra/inter-RAT mobility, maintain an external Packet Data Unit (PDU) point of interconnect to a particular data network (e.g., enterprise network 160), perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, forward an "end marker" to a RAN node (e.g., gNodeB 310), and/or perform other types of user plane processes. UPF 330 may communicate with SMF 340 using an N4 interface 332 and connect to data network 140 using an N6 interface 334.

SMF 340 may perform session establishment, session modification, and/or session release, perform IP address allocation and management, perform Dynamic Host Configuration Protocol (DHCP) functions, perform selection and control of UPF 330, configure traffic steering at UPF 330 to guide the traffic to the correct destinations, terminate interfaces toward PCF 354, perform lawful intercepts, charge data collection, support charging interfaces, control and coordinate of charging data collection, terminate session management parts of NAS messages, perform downlink data notification, manage roaming functionality, and/or perform other types of control plane processes for managing user plane data. SMF 340 may be accessible via an Nsmf interface 342.

AF 350 may provide services associated with a particular application, such as, for example, an application for influencing traffic routing, an application for accessing NEF 360, an application for interacting with a policy framework for policy control, and/or other types of applications. AF 350 may be accessible via an Naf interface 351, also referred to as an NG5 interface.

UDM 352 may maintain subscription information for UE devices 110, manage subscriptions, generate authentication credentials, handle user identification, perform access authorization based on subscription data, perform network function registration management, maintain service and/or session continuity by maintaining assignment of SMF 340 for ongoing sessions, support SMS delivery, support lawful intercept functionality, and/or perform other processes associated with managing user data. UDM 352 may be accessible via a Nudm interface 353.

PCF 354 may support policies to control network behavior, provide policy rules to control plane functions (e.g., to SMF 340), access subscription information relevant to policy decisions, perform policy decisions, and/or perform other types of processes associated with policy enforcement. PCF 354 may be accessible via Npcf interface 355. Furthermore, PCF 354 may obtain an enterprise policy that includes a mapping between applications associated with the enterprise and QoS classes and may provide the enterprise policy to UPF 330 via SMF 340. CHF 356 may perform charging and/or billing functions for core network 150. CHF 356 may be accessible via Nchf interface 357.

NRF 358 may support a service discovery function and maintain profiles of available network function (NF) instances and their supported services. An NF profile may include an NF instance identifier (ID), an NF type, a Public Land Mobile Network (PLMN) ID associated with the NF, network slice IDs associated with the NF, capacity information for the NF, service authorization information for the NF, supported services associated with the NF, endpoint information for each supported service associated with the NF, and/or other types of NF information. NRF 358 may be accessible via an Nnrf interface 359.

NEF 360 may expose capabilities and events to other NFs, including 3rd party NFs, AFs, edge computing NFs, and/or other types of NFs. Furthermore, NEF 360 may secure provisioning of information from external applications to core network 150, translate information between core network 150 and devices/networks external to core network 150, support a Packet Flow Description (PFD) function, and/or perform other types of network exposure functions. NEF 360 may be accessible via Nnef interface 361.

NSSF 362 may select a set of network slice instances to serve a particular UE device 110, determine network slice selection assistance information (NSSAI), determine a particular AMF 320 to serve a particular UE device 110, and/or perform other types of processing associated with network slice selection or management. NSSF 362 may be accessible via Nnssf interface 363.

AUSF 364 may perform authentication. For example, AUSF 364 may implement an Extensible Authentication Protocol (EAP) authentication server and may store authentication keys for UE devices 110. AUSF 364 may be accessible via Nausf interface 365. EIR 366 may authenticate a particular UE device 110 based on UE device identity, such as a Permanent Equipment Identifier (PEI). For example, EIR 366 may check to see if a PEI has been blacklisted. EIR 366 may be accessible via Neir interface 367.

NWDAF 368 may collect analytics information associated with radio access network 120 and/or core network 150. For example, NWDAF 368 may collect accessibility KPIs (e.g., an RRC setup success rate, a RAB success rate, etc.), retainability KPIs (e.g., a call drop rate, etc.), mobility KPIs (e.g., a handover success rate, etc.), service integrity KPIs (e.g., downlink average throughput, downlink maximum throughput, uplink average throughput, uplink maximum throughput, etc.), utilization KPIs (e.g., resource block utilization rate, average processor load, etc.), availability KPIs (e.g., radio network unavailability rate, etc.), traffic KPIs (e.g., downlink traffic volume, uplink traffic volume, average number of users, maximum number of users, a number of voice bearers, a number of video bearers, etc.), response time KPIs (e.g., latency, packet arrival time, etc.), and/or other types of wireless network KPIs.

SMSF 370 may perform SMS services for UE devices 110. SMSF 370 may be accessible via Nsmsf interface 371. SEPP 372 may implement application layer security for all layer information exchanged between two NFs across two different PLMNs. N3IWF 374 may interconnect to a non-3GPP access device, such as, for example, WiFi AP 114. N3IWF 374 may facilitate handovers for UE device 110 between radio access network 120 and the non-3GPP access device.

Enterprise network 160 may include AF 380. AF 380 may communicate with PCF 354 using Rx interface 386. Rx interface 386 may be implemented, for example, using Diameter protocol. AF 380 may provide an enterprise policy associated with enterprise network 160 to PCF 354 over Rx interface 386.

Although FIG. 3 shows exemplary components of core network 150, in other implementations, core network 150 may include fewer components, different components, differently arranged components, or additional components than depicted in FIG. 3. Additionally, or alternatively, one or more components of core network 150 may perform functions described as being performed by one or more other components of core network 150. For example, core network 150 may include additional function nodes not shown in FIG. 3, such as a Unified Data Repository (UDR), an Unstructured Data Storage Network Function (UDSF), a Location Management Function (LMF), a Lawful Intercept Function (LIF), a Binding Session Function (BSF), and/or other types of functions. Furthermore, while particular interfaces have been described with respect to particular function nodes in FIG. 3, additionally, or alternatively, core network 150 may include a reference point architecture that includes point-to-point interfaces between particular function nodes.

Figure 4:
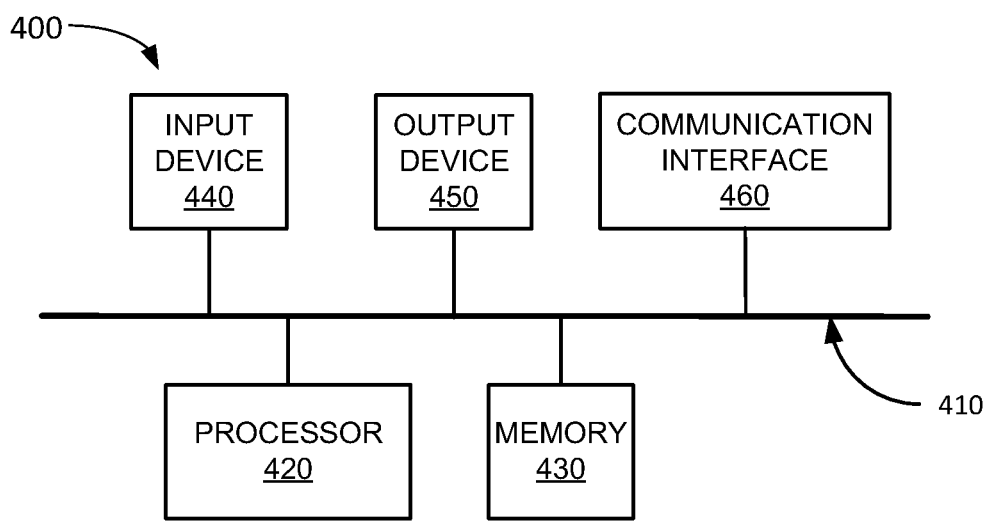
FIG. 4 is a diagram illustrating exemplary components of a device that may be included in a component according to an implementation described herein.

FIG. 4 illustrates example components of a device 400 according to an implementation described herein. UE device 110, WiFi AP 114, MEC device 145, eNodeB 210, SGW 230, PGW 240, MME 250, PCRF device 260, HSS 270, CSCF 280, gNodeB 310, AMF 320, UPF 330, SMF 340, AF 350, UDM 352, PCF 354, CHF 356, NRF 358, NEF 360, NSSF 362, AUSF 364, EIR 366, NWDAF 368, SMSF 370, SEPP 372, N3IWF 374, and/or other components of core network 150, may each include one or more devices 400. As shown in FIG. 4, device 400 may include a bus 410, a processor 420, a memory 430, an input device 440, an output device 450, and a communication interface 460.

Bus 410 may include a path that permits communication among the components of device 400. Processor 420 may include any type of single-core processor, multi-core processor, microprocessor, latch-based processor, and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic.

Memory 430 may include any type of dynamic storage device that may store information and/or instructions, for execution by processor 420, and/or any type of non-volatile storage device that may store information for use by processor 420. For example, memory 430 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 440 may allow an operator to input information into device 400. Input device 440 may include, for example, a keyboard, a mouse, a pen, a microphone, a remote control, an audio capture device, an image and/or video capture device, a touch-screen display, and/or another type of input device. In some embodiments, device 400 may be managed remotely and may not include input device 440. In other words, device 400 may be "headless" and may not include a keyboard, for example.

Output device 450 may output information to an operator of device 400. Output device 450 may include a display, a printer, a speaker, and/or another type of output device. For example, device 400 may include a display, which may include a liquid-crystal display (LCD) for displaying content to the customer. In some embodiments, device 400 may be managed remotely and may not include output device 450. In other words, device 400 may be "headless" and may not include a display, for example.

Communication interface 460 may include a transceiver that enables device 400 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 460 may include a transmitter that converts baseband signals to radio frequency (RF) signals and/or a receiver that converts RF signals to baseband signals. Communication interface 460 may be coupled to one or more antennas/antenna arrays for transmitting and receiving RF signals.

Communication interface 460 may include a logical component that includes input and/or output ports, input and/or output systems, and/or other input and output components that facilitate the transmission of data to other devices. For example, communication interface 460 may include a network interface card (e.g., Ethernet card) for wired communications and/or a wireless network interface (e.g., a WiFi) card for wireless communications. Communication interface 460 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 400 may perform certain operations relating to QoS management for enterprise applications. Device 400 may perform these operations in response to processor 420 executing software instructions contained in a computer-readable medium, such as memory 430. A computer-readable medium may be defined as a non-transitory memory device. A memory device may be implemented within a single physical memory device or spread across multiple physical memory devices. The software instructions may be read into memory 430 from another computer-readable medium or from another device. The software instructions contained in memory 430 may cause processor 420 to perform processes described herein. Alternatively, hardwired circuitry may be used in place of, or in combination with, software instructions to implement processes described herein. Thus, implementations described herein are not limited to any specific combination of hardware circuitry and software.

Although FIG. 4 shows exemplary components of device 400, in other implementations, device 400 may include fewer components, different components, additional components, or differently arranged components than depicted in FIG. 4. Additionally, or alternatively, one or more components of device 400 may perform one or more tasks described as being performed by one or more other components of device 400.

Figure 5A:
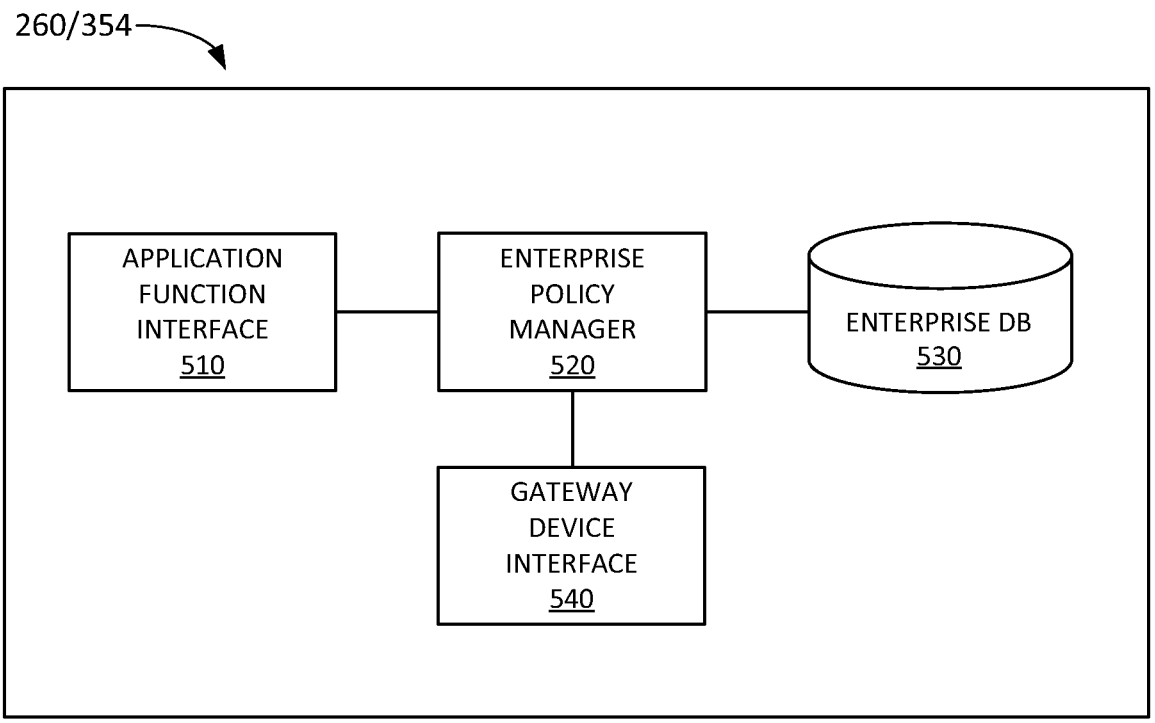
FIG. 5A is a diagram illustrating exemplary components of a policy device according to an implementation described herein.

FIG. 5A is a diagram illustrating exemplary components of a policy device corresponding to PCRF 260 or PCF 354. The components of PCRF 260 or PCF 354 may be implemented, for example, via processor 420 executing instructions from memory 430. Alternatively, some or all of the components of PCRF 260 or PCF 354 may be implemented via hard-wired circuitry.

As shown in FIG. 5A, PCRF 260 or PCF 354 may include an application function interface 510, an enterprise policy manager 520, an enterprise database (DB) 530, and a gateway device interface 540.

Application function interface 510 may be configured to communicate with an application function device, such as AF 280, AF 350, and/or another type of device in enterprise network 160. Application function interface 510 may receive a QoS policy associated with an enterprise from enterprise network 160 and may provide the received QoS policy to enterprise policy manager 520.

Enterprise policy manager 520 may manage policies associated with enterprises and apply the policies to UE devices 110. Enterprise DB 530 may store enterprise policies associated with particular enterprises. Exemplary information that may be stored in enterprise DB 530 is described below with reference to FIG. 5B. For example, enterprise policy manager 520 may determine that UE device 110 associated with an enterprise has attached to core network 150, identify a gateway device (e.g., PGW 240, UPF 330, etc.) associated with UE device 110, identify an enterprise associated with UE device 110, select an enterprise policy associated with the identified enterprise based on information stored in enterprise DB 530, and provide the selected enterprise policy to the identified gateway device.

Gateway device interface 540 may be configured to communicate with gateway devices. For example, gateway device interface 540 may provide policies to gateway devices, such as to PGW 240 and/or to UPF 330 via SMF 340.

Although FIG. 5A shows exemplary components of PCRF 260 or PCF 354, in other implementations, PCRF 260 or PCF 354 may include fewer components, different components, differently arranged components, or additional components than depicted in FIG. 5A. Additionally, or alternatively, one or more components of PCRF 260 or PCF 354 may perform functions described as being performed by one or more other components of PCRF 260 or PCF 354.

Figure 5B:
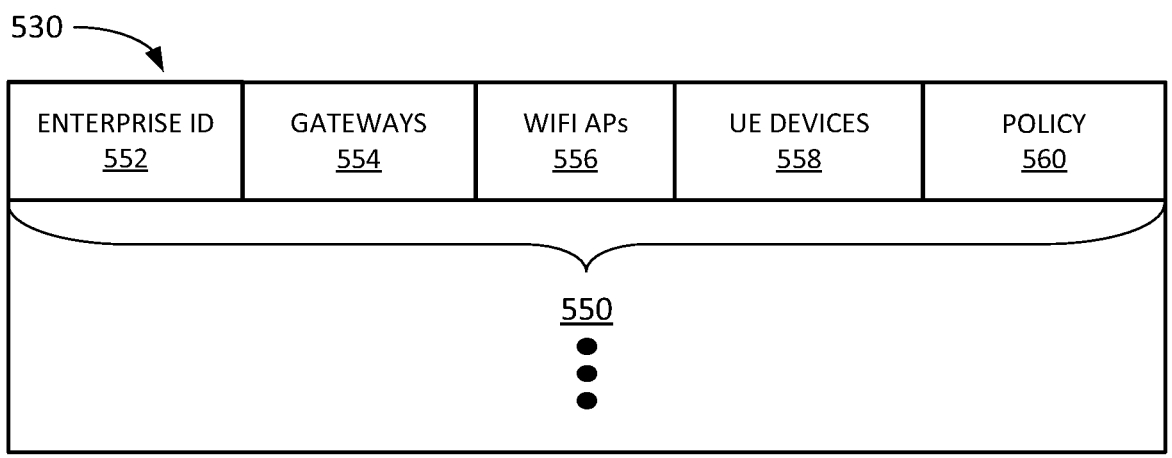
FIG. 5B is a diagram illustrating exemplary components of the enterprise database according to an implementation described herein.

FIG. 5B is a diagram illustrating exemplary information stored in enterprise DB 530. As shown in FIG. 5B, enterprise DB 530 may include one or more enterprise records 550. Each enterprise record 550 may store information relating to a particular enterprise. Enterprise record 550 may include an enterprise identifier (ID) field 552, a gateways field 554, a WiFi APs field 556, a UE devices field 558, and a policy field 560.

Enterprise field 552 may store information identifying an enterprise. For example, enterprise field 552 may include an ID associated with the enterprise, information identifying one or more enterprise networks 160 associated with the enterprise, information identifying QoS classes enabled for the enterprise, information identifying MEC networks 140 associated with the enterprise, and/or other types of information associated with the enterprise.

Gateways field 554 may store information identifying one or more gateway devices associated with the enterprise. For example, gateways field 554 may identify one or more PGWs 240 and/or UPFs 330 associated with the enterprise. Furthermore, gateways field 554 may store information identifying the APNs associated with the one or more gateway devices associated with the enterprise.

WiFi APs field 556 may store information identifying one or more WiFi APs 114 associated with the enterprise. UE devices field 558 may store information identifying UE devices 110 associated with the enterprise. For example, for each UE device 110 associated with the enterprise, UE devices field 558 may store one or more IDs associated with UE device 110, such as, for example, a Mobile Directory Number (MDN), an International Mobile Subscriber Identity (IMSI), a Mobile Station International Subscriber Directory Number (MSISDN), an International Mobile Equipment Identity (IMEI), an IP address, a Media Access Control (MAC) address, and/or another type of identifier associated with UE device 110.

Policy field 560 may store a policy associated with the enterprise. For example, policy field 560 may store a mapping between applications associated with the enterprise and QoS classes. An application may be identified by an application label, a tunnel label ID, a VLAN ID, a DSCP value, and/or another type of ID. Furthermore, a policy may include a GBR and/or an AMBR associated with a particular application or a particular QoS class.

In some implementations, a default policy may be generated for an enterprise if the enterprise does not select or provide a QoS policy, or if an enterprise selects a default QoS policy. Furthermore, in some implementations, multiple QoS policies may be associated with an enterprise. For example, an enterprise may select different QoS policies for different enterprise networks 160 associated with the enterprise, different QoS policies for different private networks 112 (e.g., WLANs) associated with the enterprise, different QoS policies for different MEC networks 140 associated with the enterprise, different QoS policies for different network slices associated with the enterprise, different QoS policies for different geographic locations, different QoS policies for different types of UE devices 110 (e.g., a first QoS policy for UE devices 110 associated with human users, a second QoS policy for MTC UE devices 110, etc.), different QoS policies for different time periods (e.g., times of day, days of week, holidays, times of year, etc.), and/or different policies for other types of parameters.

Although FIG. 5B shows exemplary components of enterprise DB 530, in other implementations, enterprise DB 530 may include fewer components, different components, additional components, or differently arranged components than depicted in FIG. 5B.

Figure 6A:
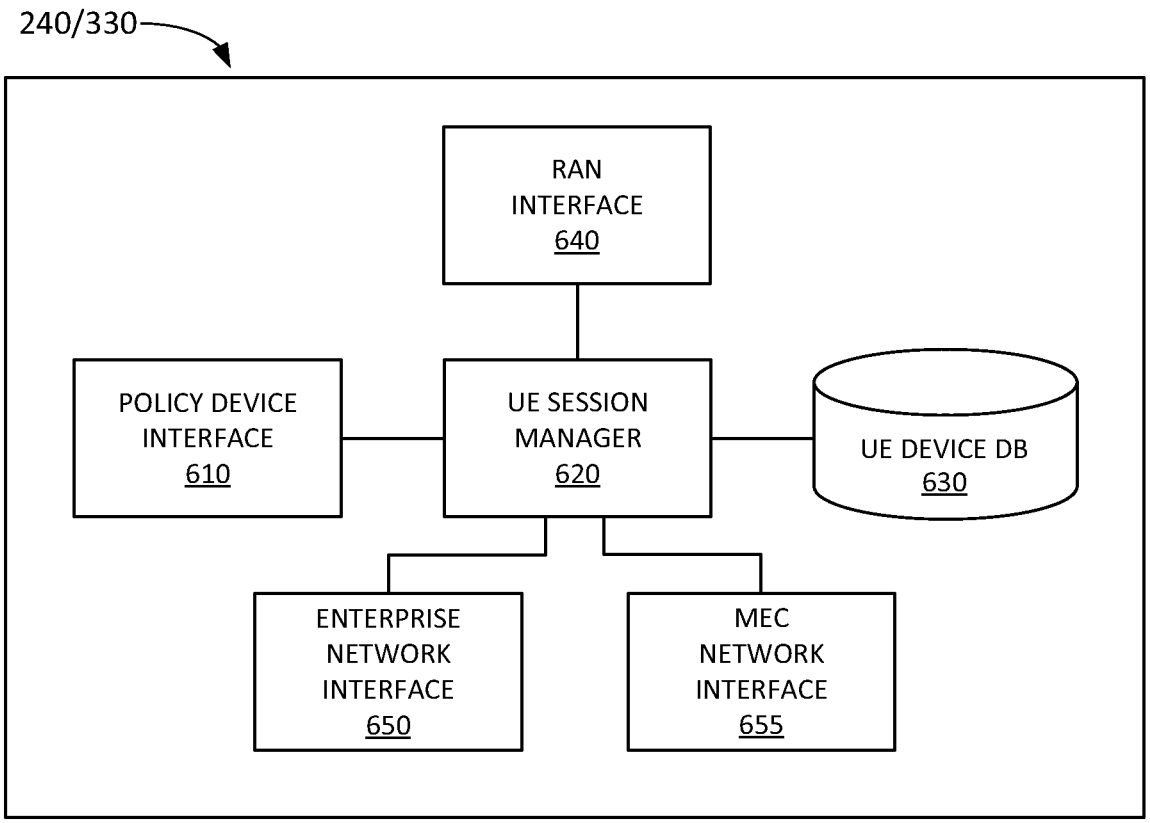
FIG. 6A is a diagram illustrating exemplary components of a gateway device according to an implementation described herein.

FIG. 6A is a diagram illustrating exemplary components of a gateway device corresponding to PGW 240 or UPF 330. The components of PGW 240 or UPF 330 may be implemented, for example, via processor 420 executing instructions from memory 430. Alternatively, some or all of the components of PGW 240 or UPF 330 may be implemented via hard-wired circuitry.

As shown in FIG. 6A, PGW 240 or UPF 330 may include a policy device interface 610, a UE session manager 620, a UE device DB 630, a RAN interface 640, an enterprise network interface 650, and a MEC network interface 655. Policy device interface 610 may be configured to communicate with a policy device, such as PCRF 260 and/or PCF 354. For example, policy device interface 610 may receive an enterprise policy from the policy device.

UE session manager 620 may manage communication sessions associated with UE devices 110. For example, UE session manager 620 may determine that UE device 110 has attached to core network 140, send an indication to a policy device that UE device 110 has attached to core network 150, and receive, in response, an enterprise policy from the policy device for an enterprise associated with UE device 110. UE session manager 620 may store the policy in UE device DB 630. UE device DB 630 may store information relating to UE devices 110 for which PGW 240 or UPF 330 manages communication sessions. Exemplary information that may be stored in UE device DB 630 is described below with reference to FIG. 6B.

UE session manager 620 may receive a request for a communication session from UE device 110, identify an application associated with the communication session, and select a QoS class for the communication based on the identified application and the enterprise policy, stored in UE device DB 630. for the enterprise associated with UE device 110. UE session manager 620 may then process messages associated with the communication session based on the selected QoS class. For example, packet for communication session with a high priority QoS class (e.g., a QCI 1 in an LTE network) may be given a high priority over packets for a communication session associated with a lower priority (e.g., a QCI higher than 1 in an LTE network).

RAN interface 640 may interface with RAN 130 and may receive data packets from UE device 110 via base station 120 and/or may provide data packets destined to UE device 110 via base station 120. Enterprise network interface 650 may interface with enterprise network 160. For example, enterprise network interface 650 may receive data packets from enterprise network 160 destined for UE device 110 and/or send data packets destined for enterprise network 160 to enterprise network 160. MEC network interface 655 may interface with MEC network 140. For example, MEC network interface 655 may receive data packets from MEC network 140 destined for UE device 110 and/or send data packets destined for MEC network 140 to MEC network 140.

Although FIG. 6A shows exemplary components of PGW 240 or UPF 330, in other implementations, PGW 240 or UPF 330 may include fewer components, different components, differently arranged components, or additional components than depicted in FIG. 6A. Additionally, or alternatively, one or more components of PGW 240 or UPF 330 may perform functions described as being performed by one or more other components of PGW 240 or UPF 330.

Figure 6B:
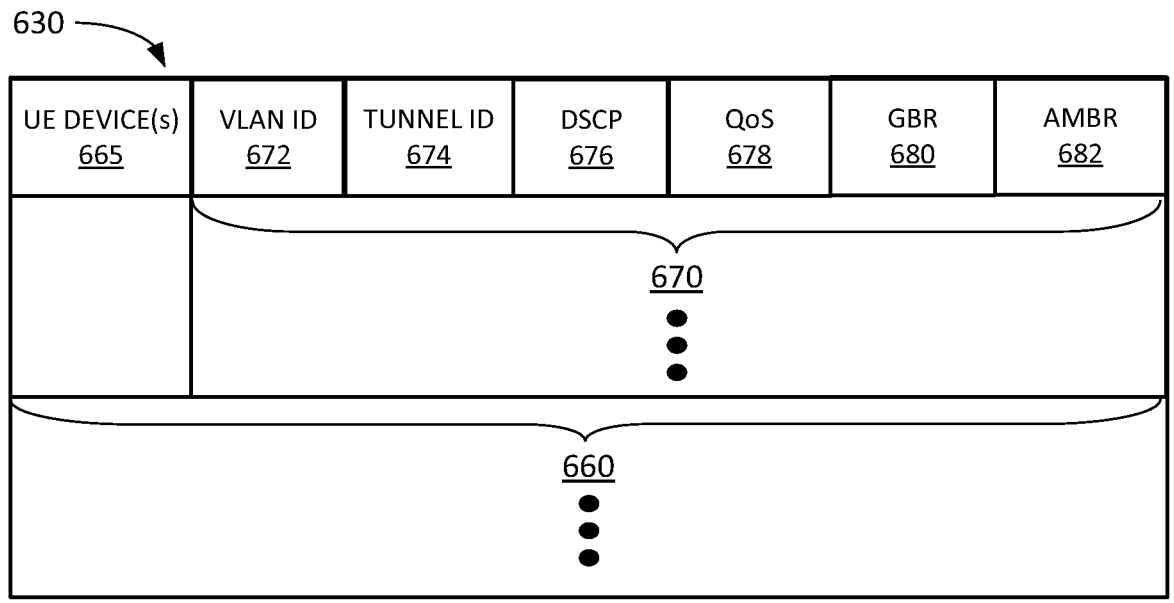
FIG. 6B is a diagram illustrating exemplary components of the user equipment (UE) database according to an implementation described herein.

FIG. 6B is a diagram illustrating exemplary information stored in UE device DB 630. As shown in FIG. 6B, UE device DB 630 may include one or more UE device records 660. Each UE device record 660 may store information relating to one or more UE devices 110 associated with an enterprise. For example, a set of UE devices 110 may be associated with a particular VLAN ID, a particular tunnel ID, a particular DSCP value, and/or another type of label or ID for an application associated with an enterprise.

UE device record 660 may include a UE device(s) field 665 and one or more mapping entries 670. UE device(s) field 665 may include one or more IDs for each UE device 110 associated with UE device record 660, such as, for example, an MDN, an IMSI, an MSISDN, an IMEI, an IP address, a MAC address, and/or another type of identifier associated with a particular UE device 110. Each mapping entry 670 may include a set of IDs and/or labels that map to a particular QoS class. Mapping entry 670 may include a VLAN ID field 672, a tunnel ID field 674, a DSCP field 676, a QoS field 678, a GBR field 680, and an AMBR field 682.

VLAN ID field 672 may store a VLAN ID associated with the particular QoS class. Tunnel ID field 674 may store a tunnel ID associated with the particular QoS class, such as, for example, an IP Security (IPSec) tunnel ID, a Secure Socket Tunneling Protocol (SSTP) ID, an Open Virtual Private Network (OpenVPN) tunnel ID, and/or another type of tunnel ID. DSCP field 676 may store a DSCP value used for prioritizing traffic in enterprise network 160 and/or private network 112.

QoS field 678 may store a QoS value for the particular QoS class. As an example, for a 4G core network, QoS field 678 may store a QCI value. As another example, for a 5G core network, QoS field 678 may store a 5G QCI (5QI) value. GBR field 680 may store a GBR value associated with the particular QoS class. For example, an enterprise may lease a 200 kilobytes per second (kbps) QCI 1 bearer and may decide to use a 20 kbps encoder for allowing a maximum of 10 voice calls at any particular time on the QCI 1 bearer. AMBR field 682 may store a maximum aggregated bitrate for a bearer that is not associated with a GBR.

Although FIG. 6B shows exemplary components of UE device DB 630, in other implementations, UE device DB 630 may include fewer components, different components, additional components, or differently arranged components than depicted in FIG. 6B.

Figure 7:
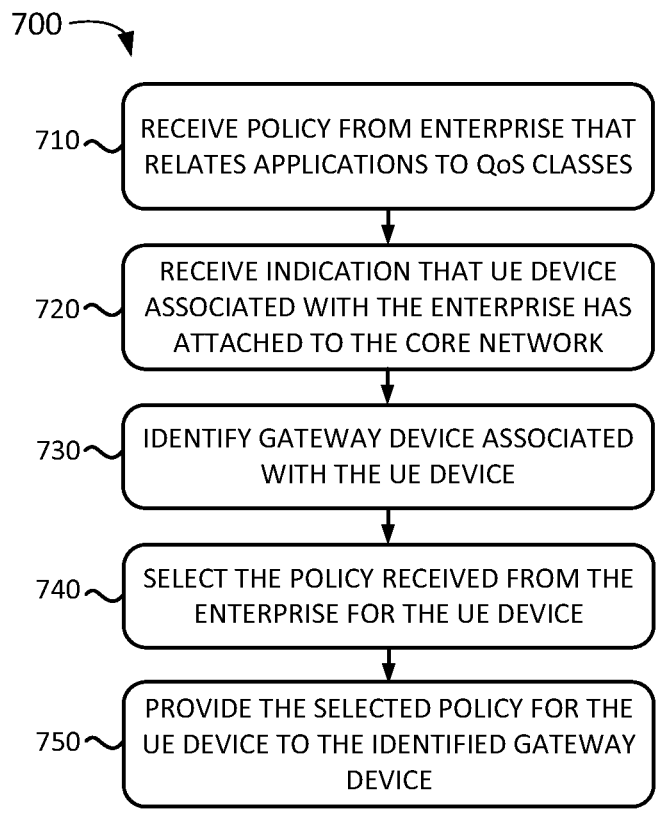
FIG. 7 illustrates a flowchart for selecting an enterprise policy according to an implementation described herein.

FIG. 7 illustrates a flowchart of a process 700 for selecting an enterprise policy according to an implementation described herein. In some implementations, process 700 of FIG. 7 may be performed by PCRF 260 or PCF 354. In other implementations, some or all of process 700 may be performed by another device or a group of devices separate from PCRF 260 or PCF 354.

As shown in FIG. 7, process 700 may include receiving a policy from an enterprise that relates applications to QoS classes (block 710). PCRF 260 or PCF 354 may receive a QoS policy associated with an enterprise from enterprise network 160. For example, PCRF 260 or PCF 354 may receive the enterprise policy via AF 280 or AF 350.

Process 700 may further include receiving an indication that a UE device associated with the enterprise has attached to the core network (block 720). For example, PCRF 260 may receive an indication from PGW 240 that UE device 110 has attached to core network 150 during an IP Connectivity Access Network (IP-CAN) session establishment procedure. As another example, PCF 354 may receive an indication from SMF 340 that UE device 10 has attached to core network 150 and established a connection to UPF 330.

Process 700 may further include identifying a gateway associated with the UE device (block 730), selecting a policy received from the enterprise for the UE device (block 740), and providing the selected policy to the identified gateway device (block 750). In response to receiving the indication that UE device has attached to core network 150, PCRF 260 or PCF 354 may identify an enterprise associated with UE device 110 and provide an enterprise policy stored in enterprise DB 530 to the gateway device. For example, PCRF 260 may provide the enterprise policy to PGW 240 over Gx interface 262. As another example, PCF 354 may provide the enterprise policy to UPF 330 via SMF 340 using Nsmf interface 342 and SMF 340 may install the policy in UPF 330 via N4 interface 332.

Figure 8:
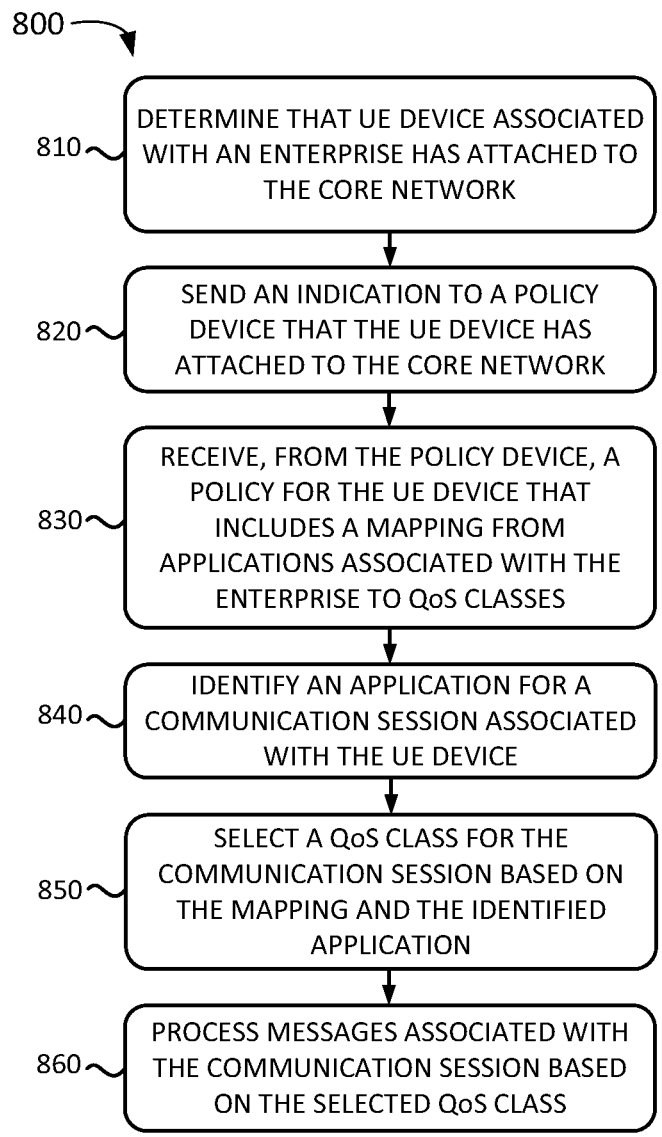
FIG. 8 illustrates a flowchart for applying an enterprise policy according to an implementation described herein.

FIG. 8 illustrates a flowchart of a process 800 for applying an enterprise policy according to an implementation described herein. In some implementations, process 800 of FIG. 8 may be performed by PGW 240 or UPF 330. In other implementations, some or all of process 700 may be performed by another device or a group of devices separate from PGW 240 or UPF 330.

As shown in FIG. 8, process 800 may include determining that a UE device associated with an enterprise has attached to the core network (block 810) and sending an indication to a policy device that the UE device has attached to the core network (block 820). For example, PGW 240 may send an indication to PCRF 260 that UE device 110 has attached to core network 150 during an IP-CAN session establishment procedure. As another example, SMF 340 may send an indication to PCF 354 that UE device 10 has attached to core network 150 and established a connection to UPF 330.

Process 800 may further include receiving, from the policy device, a policy for the UE device that includes a mapping from applications, associated with the enterprise, to QoS classes (block 830). For example, PGW 240 may receive an enterprise policy for UE device 110 from PCRF 260 over Gx interface 262. As another example, SMF 340 may receive an enterprise policy for UE device 110 from PCF 354 using Nsmf interface 342 and install the policy in UPF 330 via N4 interface 332. The received enterprise policy may be stored in UE DB 630.

Process 800 may further include identifying an application for a communication session associated with the UE device (block 840), selecting a QoS class for the communication session based the mapping and the identified application (block 850), and processing messages associated with the communication session based on the selected QoS class (block 860). For example, PGW 240 or UPF 330 receive a request for a communication session associated with UE device 110. The communication session may be associated with a VLAN ID, a tunnel ID, a DSCP value, and/or another type of identifier for an application associated with an enterprise. PGW 240 or UPF 330 may access UE DB 630 and identify a QoS class for the identifier associated with the communication session. PGW 240 or UPF 330 may assign the identified QoS class to the communication session and may process messages associated with the communication session based on the selected QoS class. For example, packet for communication session with a high priority QoS class (e.g., a QCI 1 in an LTE network) may be given a high priority over packets for a communication session associated with a lower priority (e.g., a QCI higher than 1 in an LTE network).

In some implementations, UE device 110 may be associated with multiple enterprise policies and PGW 240 or UPF 330 may apply a particular policy based on one or more parameters associated with UE device 110. For example, PGW 240 or UPF 330 may select different QoS policies for different enterprise networks 160 associated with the enterprise, different QoS policies for different private networks 112 (e.g., WLANs) associated with the enterprise, different QoS policies for different MEC networks 140 associated with the enterprise, different QoS policies for different network slices associated with the enterprise, different QoS policies for different geographic locations, different QoS policies for different types of UE devices 110 (e.g., a first QoS policy for UE devices 110 associated with human users, a second QoS policy for MTC UE devices 110, etc.), different QoS policies for different time periods (e.g., times of day, days of week, holidays, times of year, etc.), and/or different policies for other types of parameters.

Additionally, in some implementations, WiFi APs 114 associated with the enterprise may be configured to implement a QoS policy associated with the enterprise. As an example, a policy device may establish an IP connection with WiFi AP 114 and provide an enterprise QoS policy to WiFi AP 114 with instructions to implement the enterprise QoS policy. As another example, the policy device may provide the enterprise QoS policy to another device in core network 150 and the other device may provide the enterprise QoS policy to WiFi AP 114 (e.g., PCF 354 may instruct N3IWF 374 to provide the enterprise QoS policy to WiFi AP 114). As yet another example, the enterprise QoS policy may be provided to WiFi AP 114 without involving the policy device, such as by using an Over-The-Air server that performs configuration of WiFi APs 114 managed by the provider of communication services that manages RAN 130 and/or core network 150.

Figure 9:
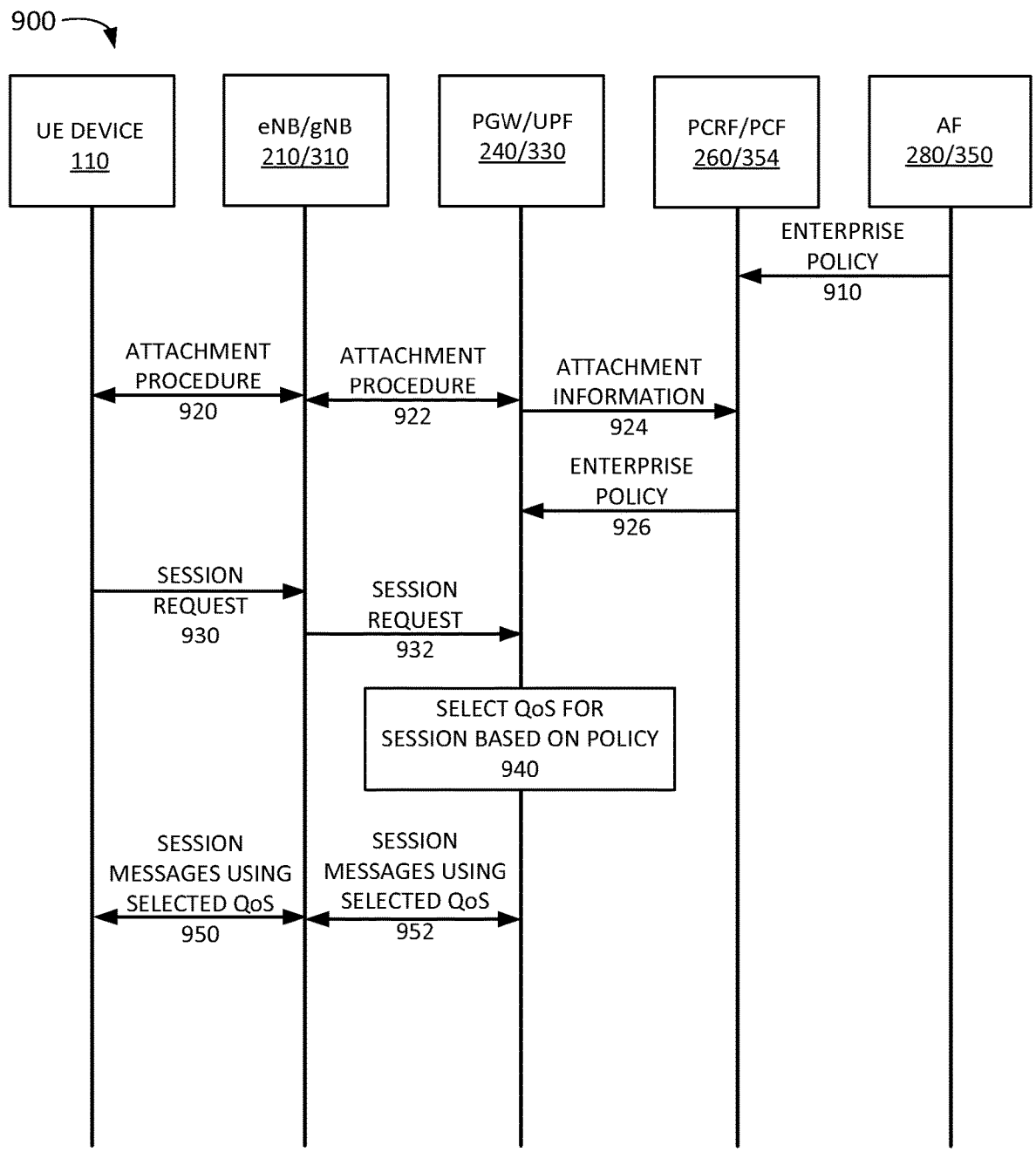
FIG. 9 illustrates an exemplary signal flow according to an implementation described herein.

FIG. 9 illustrates an exemplary signal flow 900 according to an implementation described herein. As shown in FIG. 9, signal flow 900 may include PCRF 260 or PCF 354 receiving an enterprise policy. For example, PCRF 260 or PCF 354 may receive the enterprise policy from AF 280 or AF 350, respectively (signal 910). At a later time, UE device 110 may attach to core network 150 via eNodeB 210 or gNodeB 310 and be assigned to a gateway device (e.g., PGW 240 or UPF 330) during the attachment process (signals 910 and 912). PGW 240 or UPF 330 may provide information relating to the attachment of UE device 110 to PCRF 260 or PCF 354, respectively (signal 924). In response, PCRF 260 or PCF 354 may identify UE device 110 as being associated with the enterprise and may provide the policy associated with the enterprise for UE device 110 to PGW 240 or UPF 330, respective (signal 926).

At a later time, UE device 110 may request a communication session connection with PGW 240 or UPF 330 via eNodeB 210 or gNodeB 310, respectively (signal 930 and 932). The communication session may be associated with a VLAN ID, a tunnel ID, a DSCP value, and/or another type of identifier for an application associated with an enterprise. PGW 240 or UPF 330 may select a QoS class for the communication session based on the receive enterprise policy (block 940) and may assign the selected QoS class to the communication session. Messages associated with the communication session may then be processed using the selected QoS class (signals 950 and 952).

FIG. 10A illustrates an exemplary enterprise policy 1000 that may be in UE DB 630 of PGW 240 or UPF 330. As shown in FIG. 10A, enterprise policy 1000 may include a mapping for a set of UE devices 110 identified by IMSI IDs IMSI-a to IMSI-n. The mapping may map a particular VLAN ID, tunnel ID and DSCP value to a particular QCI for three different classes of traffic: voice traffic, high priority traffic, and best effort traffic.

FIG. 10B illustrates an exemplary enterprise policy 1050 that may be provided to WiFi AP 114. As shown in FIG. 10B, enterprise policy 1050 may include a mapping for a set of QoS classes that include a voice QoS class, a video telephony QoS class, an email and messaging QoS class, and a web browsing QoS class. Enterprise policy 1050 may be provided to WiFi AP 114 by a device in core network 150 (e.g., PCF 354, N3IWF 374, etc.) or by another device, such as a server device that performs OTA updates for WiFi APs 114 associated with the provider of communication services that manages RAN 130 and/or core network 150.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 7 and 8, and a series of signals have been described with respect to FIG. 9, the order of the blocks, and/or signals, may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
    determining, by a device in a core network associated with a radio access network, that a user equipment (UE) device, associated with an enterprise, has attached to the core network via a base station in the radio access network;
    obtaining, by the device, a mapping between a plurality of applications associated with the enterprise and a plurality of Quality of Service (QoS) classes, wherein the mapping includes a mapping from a plurality of Virtual Local Area Network (VLAN) labels for the plurality of applications associated with the enterprise to the plurality of QoS classes, and wherein at least two different VLAN labels from the plurality of VLAN labels map to two different QoS classes from the plurality of QoS classes;
    identifying, by the device, an application, of the plurality of applications, for a communication session associated with the UE device;
    selecting, by the device, a QoS class, from the plurality of QoS classes based on the identified application and the obtained mapping; and
    processing, by the device, messages associated with the communication session based on the selected QoS class.

2. The method of claim 1, wherein obtaining the mapping between the plurality of applications associated with the enterprise and the plurality of QoS classes includes:
    receiving the mapping from a policy device in the core network.

3. The method of claim 2, wherein the device includes a Packet Data Network Gateway (PGW) and wherein the policy device includes a Policy and Charging Rules Function (PCRF).

4. The method of claim 2, wherein the device includes a User Plane Function (UPF) and wherein the policy device includes a Policy Control Function (PCF).

5. The method of claim 1, wherein the mapping further includes a mapping from a plurality of Differentiated Services Code Point (DSCP) values for the plurality of applications associated with the enterprise to the plurality of QoS classes.

6. The method of claim 1, wherein the mapping further includes a mapping from a plurality of tunnel labels for the plurality of applications associated with the enterprise to the plurality of QoS classes.

7. The method of claim 1, wherein the mapping further includes a guaranteed bit rate (GBR) value for at least one of the plurality of applications associated with the enterprise.

8. The method of claim 1, wherein the mapping further includes an aggregate maximum bit rate (AMBR) value for at least one of the plurality of applications associated with the enterprise.

9. A device comprising:
    a processor configured to:
        determine, in a core network associated with a radio access network, that a user equipment (UE) device, associated with an enterprise, has attached to the core network via a base station in the radio access network;
        obtain a mapping between a plurality of applications associated with the enterprise and a plurality of Quality of Service (QoS) classes, wherein the mapping includes a mapping from a plurality of Virtual Local Area Network (VLAN) labels for the plurality of applications associated with the enterprise to the plurality of QoS classes and wherein at least two different VLAN labels from the plurality of VLAN labels map to two different QoS classes from the plurality of QoS classes;
        identify an application, of the plurality of applications, for a communication session associated with the UE device;
        select a QoS class, from the plurality of QoS classes based on the identified application and the obtained mapping; and
        process messages associated with the communication session based on the selected QoS class.

10. The device of claim 9, wherein obtaining the mapping between the plurality of applications associated with the enterprise and the plurality of QoS classes includes:
    receiving the mapping from a policy device in the core network.

11. The device of claim 10, wherein the device includes a Packet Data Network Gateway (PGW) and wherein the policy device includes a Policy and Charging Rules Function (PCRF).

12. The device of claim 10, wherein the device includes a User Plane Function (UPF) and wherein the policy device includes a Policy Control Function (PCF).

13. The device of claim 9, wherein the mapping further includes a mapping from a plurality of Differentiated Services Code Point (DSCP) values for the plurality of applications associated with the enterprise to the plurality of QoS classes.

14. The device of claim 9, wherein the mapping further includes a mapping from a plurality of tunnel labels for the plurality of applications associated with the enterprise to the plurality of QoS classes.

15. The device of claim 9, wherein the mapping further includes at least one of a guaranteed bit rate (GBR) value for at least one of the plurality of applications associated with the enterprise or an aggregate maximum bit rate (AMBR) value for at least one of the plurality of applications associated with the enterprise.

16. A system comprising:
    a policy device configured to:
        generate a policy that includes a mapping between a plurality of applications associated with the enterprise and a plurality of Quality of Service (QoS) classes, wherein the mapping includes a mapping from a plurality of Virtual Local Area Network (VLAN) labels for the plurality of applications associated with the enterprise to the plurality of QoS classes, and wherein at least two different VLAN labels from the plurality of VLAN labels map to two different QoS classes from the plurality of QoS classes; and
    a gateway device configured to:

determine, in a core network associated with a radio access network, that a user equipment (UE) device, associated with an enterprise, has attached to the core network via a base station in the radio access network;

obtain the mapping from the policy device;

identify an application, of the plurality of applications, for a communication session associated with the UE device;

select a QoS class, from the plurality of QoS classes based on the identified application and the obtained mapping; and process messages associated with the communication session based on the selected QoS class.

17. The system of claim 16, wherein the gateway device includes a Packet Data Network Gateway (PGW) and wherein the policy device includes a Policy and Charging Rules Function (PCRF).

18. The system of claim 16, wherein the gateway device includes a User Plane Function (UPF) and wherein the policy device includes a Policy Control Function (PCF).

19. The method of claim 1, wherein the mapping further includes a mapping from a plurality of application labels for the plurality of applications associated with the enterprise to the plurality of QoS classes.

20. The device of claim 9, wherein the mapping further includes a mapping from a plurality of application labels for the plurality of applications associated with the enterprise to the plurality of QoS classes.

* * * * *